(12) United States Patent
Hormati

(10) Patent No.: US 10,581,644 B2
(45) Date of Patent: Mar. 3, 2020

(54) LOW POWER CHIP-TO-CHIP BIDIRECTIONAL COMMUNICATIONS

(71) Applicant: Kandou Labs, S.A., Lausanne (CH)

(72) Inventor: Ali Hormati, Ecublens Vaud (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 16/174,147

(22) Filed: Oct. 29, 2018

(65) Prior Publication Data

US 2019/0068409 A1 Feb. 28, 2019

Related U.S. Application Data

(63) Continuation of application No. 15/636,309, filed on Jun. 28, 2017, now Pat. No. 10,116,468.

(51) Int. Cl.
*H04W 72/04* (2009.01)
*H04L 25/02* (2006.01)
(Continued)

(52) U.S. Cl.
CPC ........... *H04L 25/0292* (2013.01); *H04B 3/14* (2013.01); *H04L 25/0272* (2013.01);
(Continued)

(58) Field of Classification Search
USPC ......................................................... 375/340
See application file for complete search history.

(56) References Cited

U.S. PATENT DOCUMENTS 3,196,351 A 7/1965 David
3,970,795 A 7/1976 Allen
(Continued)

FOREIGN PATENT DOCUMENTS

CN 1864346 A 11/2006
CN 101854223 A 10/2010
(Continued)

OTHER PUBLICATIONS

Abbasfar, Aliazam , "Generalized Differential Vector Signaling", IEEE International Conference on Communications, ICC '09, Jun. 14, 2009, 1-5 (5 pages).
(Continued)

*Primary Examiner* — Eva Y Puente
(74) *Attorney, Agent, or Firm* — Invention Mine LLC

(57) ABSTRACT

Methods and systems are described for receiving symbols of a codeword via wires of a multi-wire bus, the codeword representing an aggregate sum of a plurality of sub-channel constituent codewords, each sub-channel constituent codeword representing a weight applied to an associated sub-channel vector of a plurality of sub-channel vectors of an orthogonal matrix, generating a plurality of comparator outputs using a plurality of common-mode resistant multi-input comparators (MICs), each common-mode resistant MIC having a set of input coefficients representing a corresponding sub-channel vector of the plurality of sub-channel vectors, each sub-channel vector (i) mutually orthogonal and (ii) orthogonal to a common-mode sub-channel vector, outputting a set of forward-channel output bits formed based on the plurality of comparator outputs, obtaining a sequence of reverse-channel bits, and transmitting the sequence of reverse-channel bits by sequentially transmitting common-mode codewords over the wires of the multi-wire bus.

20 Claims, 7 Drawing Sheets

(51) Int. Cl.
*H04L 25/49* (2006.01)
*H04L 25/08* (2006.01)
*H04B 3/14* (2006.01)
*H04L 25/14* (2006.01)

(52) U.S. Cl.
CPC ........ *H04L 25/085* (2013.01); *H04L 25/4919* (2013.01); *H04L 25/14* (2013.01); *H04W 72/042* (2013.01)

(56) References Cited

U.S. PATENT DOCUMENTS

| | | |
|---|---|---|
| 4,163,258 A | 7/1979 | Ebihara et al. |
| 4,499,550 A | 2/1985 | Ray et al. |
| 5,053,974 A | 10/1991 | Penz |
| 5,166,956 A | 11/1992 | Baltus et al. |
| 5,311,516 A | 5/1994 | Kuznicki et al. |
| 5,331,320 A | 7/1994 | Cideciyan et al. |
| 5,412,689 A | 5/1995 | Chan et al. |
| 5,449,895 A | 9/1995 | Hecht et al. |
| 5,553,097 A | 9/1996 | Dagher |
| 5,856,935 A | 1/1999 | Moy et al. |
| 5,982,954 A | 11/1999 | Delen et al. |
| 6,005,895 A | 12/1999 | Perino et al. |
| 6,084,883 A | 7/2000 | Norrell et al. |
| 6,084,958 A | 7/2000 | Blossom |
| 6,097,732 A | 8/2000 | Jung |
| 6,154,498 A | 11/2000 | Dabral et al. |
| 6,226,330 B1 | 5/2001 | Mansur |
| 6,278,740 B1 | 8/2001 | Nordyke |
| 6,317,465 B1 | 11/2001 | Akamatsu et al. |
| 6,359,931 B1 | 3/2002 | Perino et al. |
| 6,452,420 B1 | 9/2002 | Wong |
| 6,483,828 B1 | 11/2002 | Balachandran et al. |
| 6,504,875 B2 | 1/2003 | Perino et al. |
| 6,556,628 B1 | 4/2003 | Poulton et al. |
| 6,621,427 B2 | 9/2003 | Greenstreet |
| 6,621,945 B2 | 9/2003 | Bissessur |
| 6,650,638 B1 | 11/2003 | Walker et al. |
| 6,661,355 B2 | 12/2003 | Cornelius et al. |
| 6,766,342 B2 | 7/2004 | Kechriotis |
| 6,865,236 B1 | 3/2005 | Terry |
| 6,876,317 B2 | 4/2005 | Sankaran |
| 6,898,724 B2 | 5/2005 | Chang |
| 6,954,492 B1 | 10/2005 | Williams |
| 6,990,138 B2 | 1/2006 | Bejjani et al. |
| 6,999,516 B1 | 2/2006 | Rajan |
| 7,023,817 B2 | 4/2006 | Kuffner et al. |
| 7,039,136 B2 | 5/2006 | Olson et al. |
| 7,075,996 B2 | 7/2006 | Simon et al. |
| 7,127,003 B2 | 10/2006 | Rajan et al. |
| 7,142,612 B2 | 11/2006 | Horowitz et al. |
| 7,180,949 B2 | 2/2007 | Kleveland et al. |
| 7,184,483 B2 | 2/2007 | Rajan |
| 7,269,212 B1 | 9/2007 | Chau et al. |
| 7,356,213 B1 | 4/2008 | Cunningham et al. |
| 7,358,869 B1 | 4/2008 | Chiarulli et al. |
| 7,633,850 B2 | 12/2009 | Ahn |
| 7,656,321 B2 | 2/2010 | Wang |
| 7,706,456 B2 | 4/2010 | Laroia et al. |
| 7,746,764 B2 | 6/2010 | Rawlins et al. |
| 7,868,790 B2 | 1/2011 | Bae |
| 7,869,546 B2 | 1/2011 | Tsai |
| 7,899,653 B2 | 3/2011 | Hollis |
| 8,050,332 B2 | 11/2011 | Chung et al. |
| 8,055,095 B2 | 11/2011 | Palotai et al. |
| 8,149,906 B2 | 4/2012 | Saito et al. |
| 8,159,375 B2 | 4/2012 | Abbasfar |
| 8,159,376 B2 | 4/2012 | Abbasfar |
| 8,199,849 B2 | 6/2012 | Oh et al. |
| 8,199,863 B2 | 6/2012 | Chen et al. |
| 8,218,670 B2 | 7/2012 | Abou |
| 8,245,094 B2 | 8/2012 | Jiang et al. |
| 8,279,745 B2 | 10/2012 | Dent |
| 8,279,976 B2 | 10/2012 | Lin et al. |
| 8,284,848 B2 | 10/2012 | Nam et al. |
| 8,289,914 B2 | 10/2012 | Li et al. |
| 8,295,250 B2 | 10/2012 | Gorokhov et al. |
| 8,365,035 B2 | 1/2013 | Hara |
| 8,472,513 B2 | 6/2013 | Malipatil et al. |
| 8,498,368 B1 | 7/2013 | Husted et al. |
| 8,520,493 B2 | 8/2013 | Goulahsen |
| 8,539,318 B2 | 9/2013 | Shokrollahi et al. |
| 8,577,284 B2 | 11/2013 | Seo et al. |
| 8,588,254 B2 | 11/2013 | Diab et al. |
| 8,588,280 B2 | 11/2013 | Oh et al. |
| 8,593,305 B1 | 11/2013 | Tajalli et al. |
| 8,620,166 B2 | 12/2013 | Guha |
| 8,644,497 B2 | 2/2014 | Clausen et al. |
| 8,649,445 B2 | 2/2014 | Cronie et al. |
| 8,687,968 B2 | 4/2014 | Nosaka et al. |
| 8,718,184 B1 | 5/2014 | Cronie et al. |
| 8,755,426 B1 | 6/2014 | Cronie et al. |
| 8,773,964 B2 | 7/2014 | Hsueh et al. |
| 8,780,687 B2 | 7/2014 | Clausen et al. |
| 8,831,440 B2 | 9/2014 | Yu et al. |
| 8,879,660 B1 | 11/2014 | Peng et al. |
| 8,938,171 B2 | 1/2015 | Tang et al. |
| 8,949,693 B2 | 2/2015 | Ordentlich et al. |
| 8,989,317 B1 | 3/2015 | Holden et al. |
| 8,996,740 B2 | 3/2015 | Wiley et al. |
| 9,015,566 B2 | 4/2015 | Cronie et al. |
| 9,071,476 B2 | 6/2015 | Fox et al. |
| 9,077,386 B1 | 7/2015 | Holden et al. |
| 9,100,232 B1 | 8/2015 | Hormati et al. |
| 9,197,470 B2 | 11/2015 | Okunev |
| 9,246,713 B2 | 1/2016 | Shokrollahi |
| 9,251,873 B1 | 2/2016 | Fox et al. |
| 9,288,082 B1 | 3/2016 | Ulrich et al. |
| 9,288,089 B2 | 3/2016 | Cronie et al. |
| 9,331,962 B2 | 5/2016 | Lida et al. |
| 9,362,974 B2 | 6/2016 | Fox et al. |
| 9,363,114 B2 | 6/2016 | Shokrollahi et al. |
| 9,401,828 B2 | 7/2016 | Cronie et al. |
| 9,432,082 B2 | 8/2016 | Ulrich et al. |
| 9,461,862 B2 | 10/2016 | Holden et al. |
| 9,479,369 B1* | 10/2016 | Shokrollahi ...... H04L 25/03006 |
| 9,509,437 B2 | 11/2016 | Shokrollahi |
| 9,537,644 B2 | 1/2017 | Jones et al. |
| 9,634,797 B2 | 4/2017 | Benammar et al. |
| 9,667,379 B2 | 5/2017 | Cronie et al. |
| 9,710,412 B2 | 7/2017 | Sengoku |
| 10,055,372 B2 | 8/2018 | Shokrollahi |
| 2001/0006538 A1 | 7/2001 | Simon et al. |
| 2002/0044316 A1 | 4/2002 | Myers |
| 2002/0152340 A1 | 10/2002 | Dreps et al. |
| 2002/0174373 A1 | 11/2002 | Chang |
| 2002/0181607 A1 | 12/2002 | Izumi |
| 2003/0086366 A1 | 5/2003 | Branlund et al. |
| 2004/0057525 A1 | 3/2004 | Rajan et al. |
| 2004/0146117 A1 | 7/2004 | Subramaniam et al. |
| 2004/0155802 A1 | 8/2004 | Lamy et al. |
| 2004/0161019 A1 | 8/2004 | Raghavan et al. |
| 2004/0239374 A1 | 12/2004 | Hori |
| 2005/0213686 A1 | 9/2005 | Love et al. |
| 2006/0013331 A1 | 1/2006 | Choi et al. |
| 2006/0126751 A1 | 6/2006 | Bessios |
| 2006/0159005 A1 | 7/2006 | Rawlins et al. |
| 2006/0291589 A1 | 12/2006 | Eliezer et al. |
| 2007/0030796 A1 | 2/2007 | Green |
| 2008/0104374 A1 | 5/2008 | Mohamed |
| 2008/0192621 A1 | 8/2008 | Suehiro |
| 2008/0316070 A1 | 12/2008 | Van et al. |
| 2009/0046009 A1 | 2/2009 | Fujii |
| 2009/0059782 A1 | 3/2009 | Cole |
| 2009/0154604 A1 | 6/2009 | Lee et al. |
| 2010/0046644 A1 | 2/2010 | Mazet |
| 2010/0054355 A1* | 3/2010 | Kinjo ............... H04B 7/0854 375/262 |
| 2010/0081451 A1 | 4/2010 | Mueck et al. |
| 2010/0215112 A1 | 8/2010 | Tsai et al. |
| 2010/0235673 A1 | 9/2010 | Abbasfar |
| 2010/0296556 A1 | 11/2010 | Rave et al. |
| 2010/0309964 A1 | 12/2010 | Oh et al. |

(56) References Cited

U.S. PATENT DOCUMENTS

| | | | |
|---|---|---|---|
| 2011/0014865 | A1 | 1/2011 | Seo et al. |
| 2011/0235501 | A1 | 9/2011 | Goulahsen |
| 2011/0268225 | A1 | 11/2011 | Cronie et al. |
| 2011/0286497 | A1 | 11/2011 | Nervig |
| 2011/0299555 | A1 | 12/2011 | Cronie et al. |
| 2011/0302478 | A1 | 12/2011 | Cronie et al. |
| 2012/0213299 | A1 | 8/2012 | Cronie et al. |
| 2013/0010892 | A1 | 1/2013 | Cronie et al. |
| 2013/0013870 | A1 | 1/2013 | Cronie et al. |
| 2013/0114392 | A1 | 5/2013 | Sun et al. |
| 2013/0259113 | A1 | 10/2013 | Kumar |
| 2014/0177645 | A1 | 6/2014 | Cronie et al. |
| 2014/0254642 | A1 | 9/2014 | Fox et al. |
| 2015/0078479 | A1 | 3/2015 | Whitby-Strevens |
| 2015/0222458 | A1 | 8/2015 | Hormati et al. |
| 2015/0236885 | A1 | 8/2015 | Ling et al. |
| 2015/0249559 | A1 | 9/2015 | Shokrollahi et al. |
| 2015/0333940 | A1 | 11/2015 | Shokrollahi |
| 2015/0349835 | A1 | 12/2015 | Fox et al. |
| 2015/0365263 | A1 | 12/2015 | Zhang et al. |
| 2015/0380087 | A1 | 12/2015 | Mittelholzer et al. |
| 2015/0381768 | A1 | 12/2015 | Fox et al. |
| 2016/0020824 | A1 | 1/2016 | Ulrich et al. |
| 2016/0036616 | A1 | 2/2016 | Holden et al. |
| 2016/0218894 | A1 | 7/2016 | Fox et al. |
| 2016/0380787 | A1 | 12/2016 | Hormati et al. |
| 2017/0272285 | A1 | 9/2017 | Shokrollahi et al. |
| 2017/0317855 | A1* | 11/2017 | Shokrollahi ........ H04L 25/0276 |
| 2019/0103903 | A1* | 4/2019 | Yang .................... H04B 7/0456 |

FOREIGN PATENT DOCUMENTS

| | | |
|---|---|---|
| JP | 2003163612 A | 6/2003 |
| WO | 2009084121 A1 | 7/2009 |
| WO | 2010031824 A1 | 3/2010 |

OTHER PUBLICATIONS

Anonymous, "Constant-weight code", Wikipedia.org, retrieved on Feb. 6, 2017, (3 pages).

Counts, Lew, et al., "One-Chip "Slide Rule" Works with Logs, Antilogs for Real-Time Processing", Analog Devices, Computational Products 6, Reprinted from Electronic Design, May 2, 1985, 3-9 (7 pages).

Jasilva, Victor, et al., "Multicarrier Orthogonal CDMA Signals for Quasi-Synchronous Communication Systems", IEEE Journal on Selected Areas in Communications, vol. 12, No. 5, Jun. 1994, 842-852 (11 pages).

Farzan, Kamran, et al., "Coding Schemes for Chip-to-Chip Interconnect Applications", IEEE Transactions on Very Large Scale Integration (VLSI) Systems, vol. 14, No. 4, Apr. 2006, 393-406 (14 pages).

Giovaneli, Carlos Lopez, et al., "Space-Frequency Coded OFDM System for Multi-Wire Power Line Communications", Power Line Communications and Its Applications, 2005 International Symposium on Vancouver, BC, Canada, IEEE XP-002433844, Apr. 6-8, 2005, 191-195 (5 pages).

Healey, Adam, et al., "A Comparison of 25 Gbps NRZ & PAM-4 Modulation used in Legacy & Premium Backplane Channels", Tyco Electronics Corporation, DesignCon 2012, Jan. 2012, 1-16 (16 pages).

Holden, Brian, "An exploration of the technical feasibility of the major technology options for 400GE backplanes", IEEE 802.3 400GE Study Group, Geneva, CH, Jul. 16, 2013, 1-18 (18 pages).

Holden, Brian, "Simulation results for NRZ, ENRZ & PAM-4 on 16-wire full-sized 400GE backplanes", IEEE 802.3 4000E Study Group, York, UK, Sep. 2, 2013, 1-19 (19 pages).

Holden, Brian, "Using Ensemble NRZ Coding for 400GE Electrical Interfaces", IEEE 802.3 400GE Study Group, May 17, 2013, 1-24 (24 pages).

Jiang, Anxiao, et al., "Rank Modulation for Flash Memories", IEEE Transactions of Information Theory, vol. 55, No. 6, Jun. 2009, 2659-2673 (16 pages).

Oh, Dan, et al., "Pseudo-Differential Vector Signaling for Noise Reduction in Single-Ended Signaling Systems", DesignCon 2009, Rambus Inc., Jan. 2009, (22 pages).

Poulton, John, "Multiwire Differential Signaling", UNC-CH Department of Computer Science Version 1.1, Aug. 6, 2003, 1-20 (20 pages).

She, James, et al., "A Framework of Cross-Layer Superposition Coded Multicast for Robust IPTV Services over WiMAX", IEEE Wireless Communications and Networking Conference, Apr. 15, 2008, 3139-3144 (6 pages).

Skliar, Osvaldo, et al., "A Method for the Analysis of Signals: the Square-Wave Method", Revista de Matematica: Teoria y Aplicationes, vol. 15, No. 2, Mar. 2008, 109-129 (21 pages).

Slepian, David, "Permutation Modulation", Proceedings of the IEE, vol. 53, No. 3, Mar. 1965, 228-236 (9 pages).

Wang, Xin, et al., "Applying CDMA Technique to Network-on-Chip", IEEE Transactions on Very Large Scale Integration (VLSI) Systems, vol. 15, No. 10, Oct. 1, 2007, 1091-1100 (10 pages).

\* cited by examiner

LOW POWER CHIP-TO-CHIP BIDIRECTIONAL COMMUNICATIONS

CROSS-REFERENCE TO RELATED APPLICATIONS

This Application is a continuation of U.S. application Ser. No. 15/636,309, filed Jun. 28, 2017, naming Ali Hormati, entitled "Low Power Chip-to-Chip Bidirectional Communications", which is hereby incorporated herein by reference in its entirety for all purposes.

REFERENCES

The following prior applications are herein incorporated by reference in their entirety for all purposes:

U.S. Pat. No. 9,288,089 of application Ser. No. 12/784,414, filed May 20, 2010, naming Harm Cronie and Amin Shokrollahi, entitled "Orthogonal Differential Vector Signaling" (hereinafter "Cronie I").

U.S. patent application Ser. No. 13/154,009, filed Jun. 5, 2011, naming Harm Cronie and Amin Shokrollahi, entitled "Error Control Coding for Orthogonal Differential Vector Signaling" (hereinafter "Cronie II").

U.S. patent application Ser. No. 14/612,241, filed Aug. 4, 2015, naming Amin Shokrollahi, Ali Hormati, and Roger Ulrich, entitled "Method and Apparatus for Low Power Chip-to-Chip Communications with Constrained ISI Ratio", hereinafter identified as [Shokrollahi I].

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I].

U.S. patent application Ser. No. 14/315,306, filed Jun. 25, 2014, naming Roger Ulrich, entitled "Multilevel Driver for High Speed Chip-to-Chip Communications", hereinafter identified as [Ulrich II].

U.S. Provisional Patent Application No. 62/328,722, filed Apr. 28, 2016, naming Omid Talebi Amiri and Richard Simpson, entitled "Low Power Multilevel Driver", hereinafter identified as [Amiri I].

FIELD OF THE INVENTION

Present embodiments relate generally to the field of communications, and more particularly to the transmission and reception of signals for conveying information within and between devices.

BACKGROUND

In communication systems, a goal is to transport information from one physical location to another. It is typically desirable that the transport of this information is reliable, is fast and consumes a minimal amount of resources. One common information transfer medium is the serial communications link, which may be based on a single wire circuit relative to ground or other common reference, or multiple such circuits relative to ground or other common reference. A common example uses singled-ended signaling ("SES").

SES operates by sending a signal on one wire, and measuring the signal relative to a fixed reference at the receiver. A serial communication link may also be based on multiple circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

There are a number of signaling methods that maintain the desirable properties of DS while increasing pin efficiency over DS. Vector signaling is a method of signaling. With vector signaling, a plurality of signals on a plurality of wires is considered collectively although each of the plurality of signals might be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector might refer to the number of degrees of freedom of signals on the plurality of wires instead of exactly the number of wires in the plurality of wires.

Any suitable subset of a vector signaling code denotes a "subcode" of that code. Such a subcode may itself be a vector signaling code. With binary vector signaling, each component or "symbol" of the vector takes on one of two possible values. With non-binary vector signaling, each symbol has a value that is a selection from a set of more than two possible values. The set of all values required to represent all symbols is called the "alphabet" of the code. Thus, as examples, a binary vector signaling code requires at least an alphabet of two values, while a ternary vector signaling code requires at least an alphabet of three values. When transmitted as physical signals on a communications medium, symbols may be represented by particular physical values appropriate to that medium; as examples, in one embodiment a voltage of 150 mV may represent a "+1" symbol and a voltage of 50 mV may represent a "−1" symbol, while in another embodiment "+1" may be represented by 800 mV and "−1" as −800 mV.

A vector signaling code, as described herein, is a collection C of vectors of the same length N, called codewords. The ratio between the binary logarithm of the size of C and the length N is called the pin-efficiency of the vector signaling code. The Orthogonal Differential Vector Signaling or ODVS codes of [Cronie I], [Cronie II], [Shokrollahi I], and [Holden I] are examples of vector signaling codes, and are used herein for descriptive purposes.

BRIEF DESCRIPTION

Methods and systems are described for receiving, at a receiver, symbols of a codeword, the symbols received via wires of a multi-wire bus, the codeword representing an aggregate sum of a plurality of sub-channel constituent codewords, each sub-channel constituent codeword representing a weight applied to an associated sub-channel vector of a plurality of sub-channel vectors of an orthogonal matrix, generating a plurality of comparator outputs using a plurality of common-mode resistant multi-input comparators (MICs), each common-mode resistant MIC having a set of input coefficients representing a corresponding sub-channel vector of the plurality of sub-channel vectors, each sub-channel vector (i) mutually orthogonal and (ii) orthogonal to a common-mode sub-channel vector, each comparator output indicative of the weight applied to the corresponding subchannel vector, outputting a set of forward-channel output bits formed based on the plurality of comparator outputs, obtaining a sequence of reverse-channel bits, and transmitting the sequence of reverse-channel bits by sequentially transmitting common-mode codewords over the wires of the multi-wire bus, each common-mode codeword transmitted by modulating weights of a common-mode sub-channel vector according to a corresponding bit in the sequence of reverse-channel bits.

In some embodiments, the set of forward-channel bits further comprises an output bit formed from a comparator output of a common-mode MIC. In some embodiments, the reverse-channel bits are selectively transmitted, and wherein the output bit formed from the common-mode MIC is formed in a time interval when the reverse-channel bits are not being transmitted.

In some embodiments, the reverse-channel bits are transmitted at a rate that is less than a symbol rate of the received symbols of the codeword. In some embodiments, the rate of the reverse-channel codeword is 256× slower than the symbol rate of the received symbols. In some embodiments, the symbol rate is 25 Gigabits per second, and wherein the rate of the reverse-channel codeword is 10 Megabits per second.

In some embodiments, the reverse-channel bits are obtained from a serializer.

In some embodiments, the reverse-channel bits are command bits. In some embodiments, the reverse-channel bits comprise error information. In some embodiments, the reverse-channel bits comprise management information, channel equalization information or wire-specific signal skew information.

DETAILED DESCRIPTION

Figure 1:
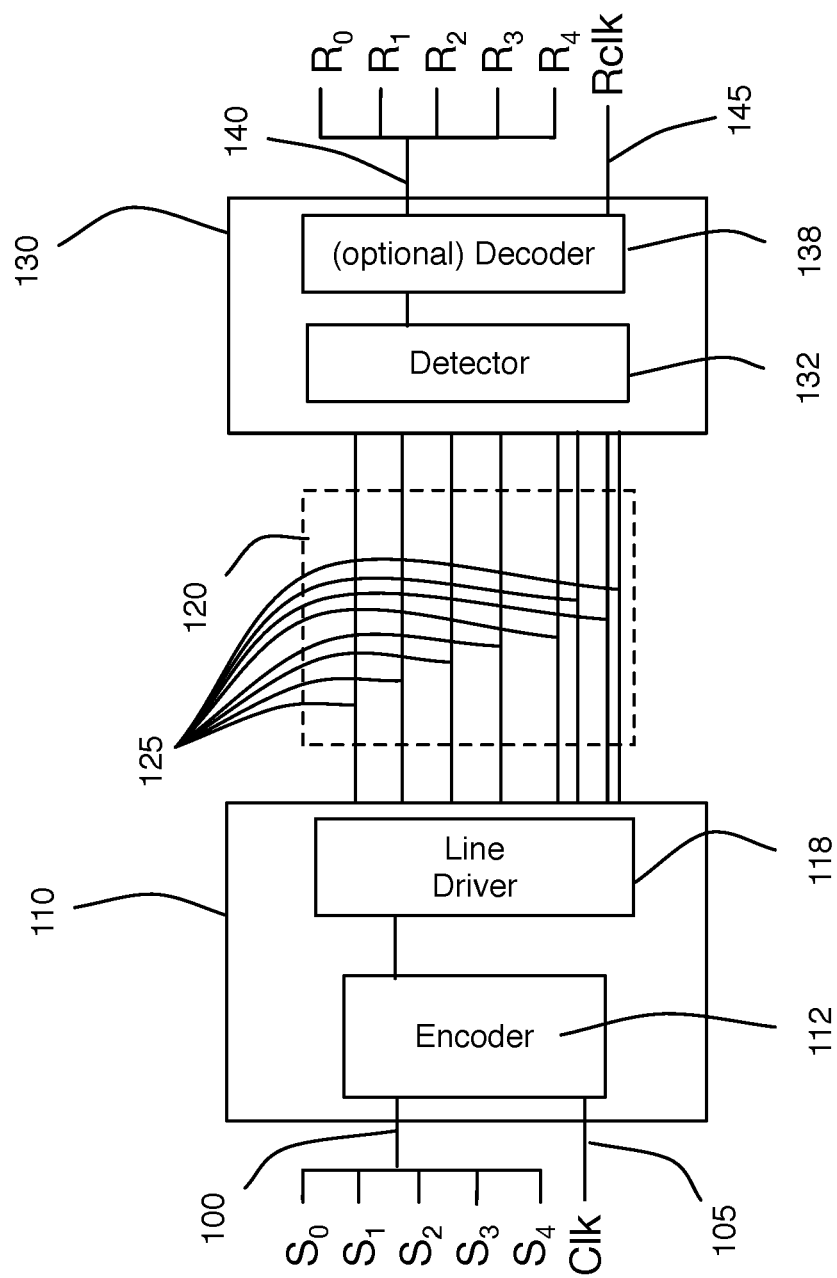
FIG. 1 is a block diagram of a communications system in accordance with some embodiments.

FIG. 1 illustrates an embodiment of a prior art communication system employing a vector signaling code. Source data to transmitter 110, herein illustrated as $S_0, S_1, S_2, S_3, S_4$ enters as a source data word 100 into encoder 112 along with clock signal Clk 105. The size of the source data word may vary and depends on the parameters of the vector signaling code. The encoder 112 generates a codeword of the vector signaling code for which the system is designed. In operation, the codeword produced by encoder 112 is used to control PMOS and NMOS transistors within driver 118, generating two, three, or more distinct voltages or currents on each of the N communication wires 125 of communications channel 120, to represent the N symbols of the codeword. In the embodiment of FIG. 1, the size of the source data word is shown as five bits and the codeword size is six symbols. Thus, communications channel 110 is shown as being comprised of six signal wires 125, each transporting one codeword symbol from transmitter 110 to receiver 130. One familiar with the encoding arts may also describe this code as having a block length of six (i.e. producing an output word of six symbols) and a code size of 32 (i.e. having 32 distinct codewords, sufficient to encode 5 binary bits of data.)

Within communications receiver 130, detector 132 reads the voltages or currents on wires 125, possibly including amplification, frequency compensation, and common mode signal cancellation. In the present example, the received results 140, herein shown as $R_0, R_1, R_2, R_3, R_4$, are provided directly by detector 132, without need of optional decoder 138. Similarly, Rclk 145 may be provided directly by detector 132 without need of optional decoder 138.

As will be readily apparent, different codes may be associated with different block sizes and different codeword sizes; for descriptive convenience and without implying limitation, the example of FIG. 1 illustrates a system using an ODVS code described in [Shokrollahi I], a so-called 5b6w code for encoding five binary bit values for transmission over six wires using, as one example, a four-valued (quaternary) symbol alphabet.

Depending on which vector signaling code is used, there may be no decoder, or no encoder, or neither a decoder nor an encoder. For example, for the 8b8w code disclosed in [Cronie II], both encoder 112 and decoder 138 exist. On the other hand, for the 5b6w code of the present example, an explicit decoder is unnecessary, as the system may be configured such that detector 132 generates the received results 140 directly.

The operation of the communications transmitter 110 and communications receiver 130 have to be completely synchronized in order to guarantee correct functioning of the communication system. In some embodiments, this synchronization is performed by an external clock shared between the transmitter and the receiver. Other embodiments may combine the clock function with one or more of the data channels, as in the well-known Biphase encoding used for serial communications, or other methods described in the cited references and known art publications.

Receivers Using Multi-Input Comparators

As described in [Holden I] and further described in [Ulrich I], an efficient embodiment of an ODVS code receiver utilizes multiple-input weighted summation elements called a multi-input comparator or MIC. A MIC defined by coefficients $a_0, a_1, \ldots, a_{m-1}$ is a summation circuit that accepts as its input a vector $(x_0, x_1, \ldots, x_{m-1})$ from a plurality of signal conductors and outputs $$\text{Result} = (a_0 * x_0 + \ldots + a_{m-1} * x_{m-1})$$ (Eqn. 2)

where $(x_0 \ldots x_{m-1})$ is the signal weight vector for the summation circuit. In many embodiments, the desired output is a binary value, thus the value Result is sliced with an analog comparator or other such signal slicer circuit to produce a binary decision output. Because this is a common use case, the colloquial name of this circuit incorporates the term "comparator", although other embodiments may apply the summation result to a PAM-3 or PAM-4 slicer to obtain ternary or quaternary outputs, or indeed may retain the analog output of Eqn. 2 for further computation.

Mathematically, the set of multi-input comparators comprising a code receiver may be concisely described using matrix notation, with the columns of the matrix corresponding to consecutive elements of input vector $(x_0, x_1, \ldots, x_{m-1})$ i.e. the plurality of signal conductor or wire inputs carrying the vector signaling code, and each row of the matrix corresponding to the vector defining a particular multi-input comparator and its output. In this notation, the value of matrix element corresponds to the weight vector or set of scaling factors applied to that column's input values by that row's multi-input comparator.

The matrix of Eqn. 3 describes one such set of multi-input comparators comprising a code receiver for the 5b6w code of [Shokrollahi I].

$$\begin{bmatrix} 1 & 1 & 1 & 1 & 1 & 1 \\ 1 & -1 & 0 & 0 & 0 & 0 \\ 1/2 & 1/2 & -1 & 0 & 0 & 0 \\ 0 & 0 & 0 & 1 & -1 & 0 \\ 0 & 0 & 0 & 1/2 & 1/2 & -1 \\ 1/3 & 1/3 & 1/3 & -1/3 & -1/3 & -1/3 \end{bmatrix} \quad \text{(Eqn. 3)}$$

In this embodiment, six input wires, represented by the six matrix columns, are processed by five multi-input comparators represented by matrix rows 2-6. The rows 2-6 may also be referred to as sub-channel vectors. For purposes to be subsequently described, the first matrix row is a special case composed of all "1" values, creating a square 6×6 matrix, herein referred to as the common-mode sub-channel vector.

As used herein, a matrix M such as that of Eqn. 3 is called "orthogonal" if $M^T M = D$ that is, if the product of the matrix and its transpose is a diagonal matrix having non-zero values only on its diagonal. This is a weaker definition than commonly used, where the result is required to be the identity matrix, i.e. having diagonal values equal to 1. Matrix M may be normalized to satisfy the stronger conventional orthogonality requirement, but as described in [Shokrollahi I] such normalization is neither necessary nor desirable in practice.

In some embodiments, each vector of weights in a row is orthogonal to all other rows, and that other than the special case of the all "1" row (e.g., the common mode row), all rows sum to zero. As this implies the comparator outputs are also orthogonal (and therefore independent,) they represent distinct communications modes, herein described as "sub-channels" or "sub-channel vectors" of the Vector Signaling Code communications system.

Given this modal interpretation, the initial row of the matrix may represent the common-mode sub-channel vector over the transmission medium. As it is desirable in a practical system for a data receiver to have common-mode rejection, the first row is set to all "1" values, maximizing the common mode contribution of each wire input to this one matrix row. As by definition all rows of the matrix are orthogonal, it follows that no other matrix row (i.e. no data receiver output) may then be impacted by common mode signals. Embodiments having such common mode rejection need not implement a physical comparator at the data receiver corresponding to the first row of their descriptive matrix.

Generating ODVS Codes Corresponding to a Receiver Matrix

As described in [Cronie I] and [Cronie II], an Orthogonal Differential Vector Signaling code may be constructed from a generator matrix by multiplication of an input modulation vector of the form $(0, a_1, a_2, \ldots, a_n)$ by the matrix M In the simplest case, each $a_i$ of this vector is the positive or negative of a single value, as example ±1, representing one bit of transmitted information.

Given our understanding of M as describing the various communications sub-channels (modes) of the system, it may readily be seen that multiplication of the matrix by such an input vector comprises modulating each sub-channel vector by the $a_i$, of that vector, with the zeroth mode corresponding to common mode transmission not being excited by the data transmitter at all. The modulated sub-channel vectors (sub-channel constituent codewords) are then when summed together to form a codeword to be transmitted on the bus. Although energy emitted by the data transmitter in the common mode is unnecessary for conventional data communication to the receiver, in some embodiments a nonzero amplitude for the common mode term is used to provide a nonzero bias or baseline value across the communications channel. In one embodiment, data transmission utilizes signals having a peak-to-peak swing of 300 mV, superimposed on a baseline voltage level of 450 mV provided to facilitate maintenance of proper input bias levels on the receiver front end.

As a further example, a code generated by this method from the matrix of Eqn. 3 is shown in Table 1.

TABLE 1

| | |
|---|---|
| ±[1, 1/3, −1/3, −1, −1/3, 1/3] | ±[1, 1/3, −1/3, 1/3, −1, −1/3] |
| ±[1/3, 1, −1/3, −1, −1/3, 1/3] | ±[1/3, 1, −1/3, 1/3, −1, −1/3] |
| ±[1/3, −1/3, 1, −1, −1/3, 1/3] | ±[1/3, −1/3, 1, 1/3, −1, −1/3] |
| ±[−1/3, 1/3, 1, −1, −1/3, 1/3] | ±[−1/3, 1/3, 1, 1/3, −1, −1/3] |
| ±[1, 1/3, −1/3, −1, 1/3, −1/3] | ±[1, 1/3, −1/3, 1/3, −1/3, −1] |
| ±[1/3, 1, −1/3, −1, 1/3, −1/3] | ±[1/3, 1, −1/3, 1/3, −1/3, −1] |
| ±[1/3, −1/3, 1, −1, 1/3, −1/3] | ±[1/3, −1/3, 1, 1/3, −1/3, −1] |
| ±[−1/3, 1/3, 1, −1, 1/3, −1/3] | ±[−1/3, 1/3, 1, 1/3, −1/3, −1] |

As may be readily observed, the alphabet of this code consists of the values +1, +1/3, −1/3, −1, thus this is a quaternary code (e.g. having an alphabet size of four.) This code will subsequently be described herein as the 5b6w or "Glasswing" code, and its corresponding receive matrix of Eqn. 3 as the "Glasswing receiver". Some embodiments of a Glasswing code transmitter and code receiver utilize two additional communications wires to transport a separate ODVS encoded channel carrying a Reference Clock signal generated by the transmitter and detected by the receiver, thus utilizing a total of eight communications wires for a complete unidirectional Glasswing interface.

In one embodiment, data transmission using the described code utilizes signals having a peak-to-peak swing of 300 mV, superimposed on a baseline voltage level of 450 mV provided to facilitate maintenance of input bias levels on the receiver front end. These signal levels may be efficiently generated using the multilevel series source terminated transmission line drivers of [Ulrich II] or other known art methods. The low power driver of [Amiri I] generates comparable output levels while using less transmission power, at the cost of greater variation in transmitter source impedance.

Figure 2:
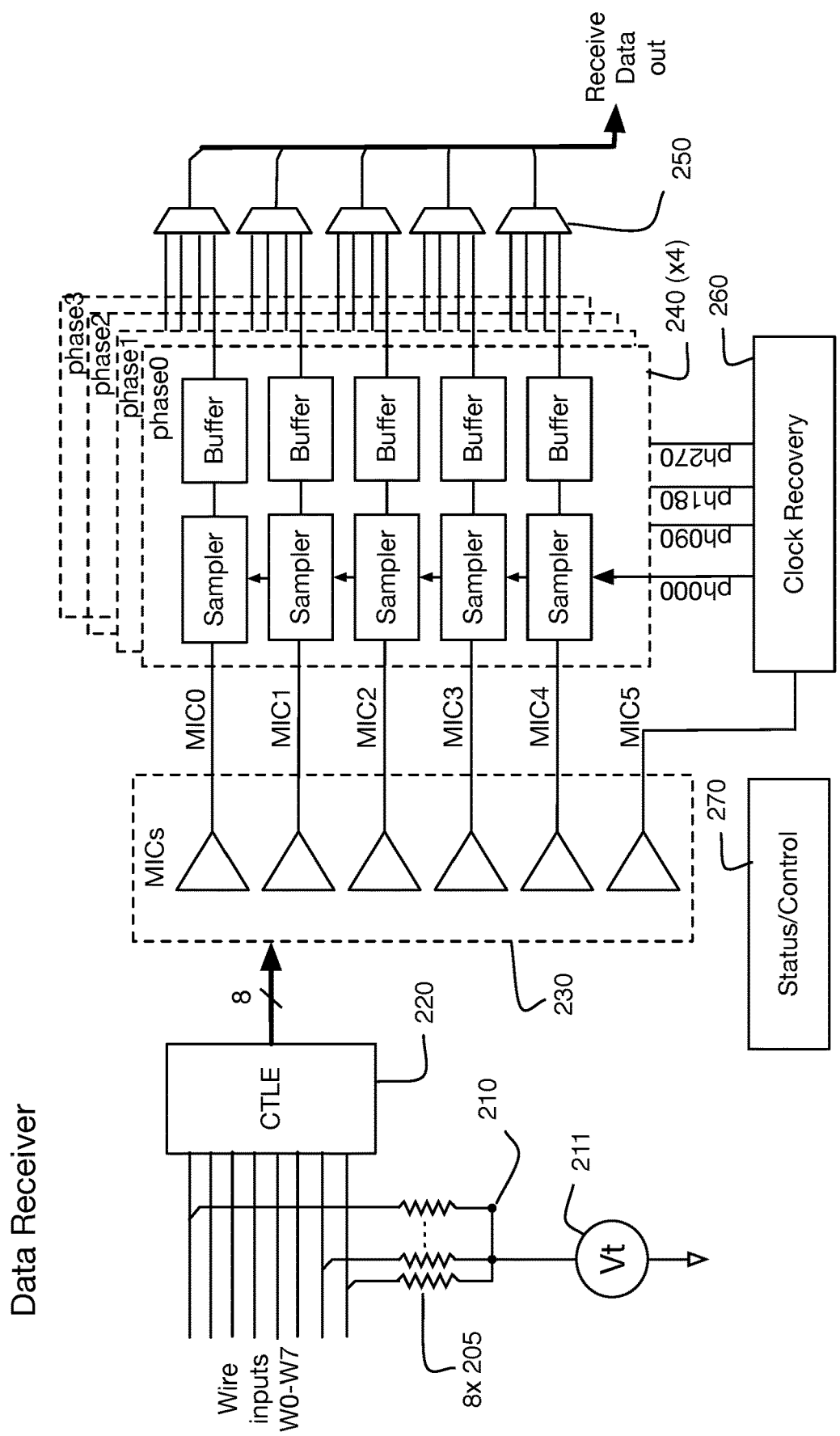
FIG. 2 is a block diagram of a prior art data receiver for the Glasswing ODVS code.

One compatible high-speed receiver embodiment illustrated in FIG. 2 is composed of transmission line termination 205, continuous-time linear equalizer (CTLE) 220, and a number of common-mode resistant multi-input comparators 230 (MICs,) each detecting one sub-channel of the received code. In FIG. 2, the common-mode resistant MIC outputs corresponding to data subchannels are labeled MIC0 through MIC4, and the MIC output detecting the Reference Clock subchannel is labeled MIC5. As is common in high-speed communications systems, four phases of receive processing 240 are shown, scheduled by four clock phases generated by Clock Recovery 260 locked to the received Reference Clock detected as MIC5. Each processing phase 240 samples, buffers, and otherwise processes received data. Multiplexers 250 combine the outputs of processing phases 240 to produce a full rate Receive Data output. Status/Control system 270 may be configured to gather error results and other statistical data, as well as to coordinate initialization, incremental adjustment, and other operational aspects of the receiver system.

Because the transmitted codeword is balanced, all line terminations 205 are connected at a common node 210, the voltage of which corresponds to the average or baseline voltage of the collective set of wires comprising the communications channel. Another embodiment incorporates bias source 211 to maintain the desired voltage at node 210, as one example if capacitive input coupling is used to break the DC path between transmitter and receiver. Another embodiment incorporates a bypass or filtering capacitor from common node 210 to ground, to reduce common-mode noise.

Secondary Communications Channel

It is common in communications systems for command, control, and management elements to maintain communications outside of the normal unidirectional data flow from transmitter to receiver. As one example, information such as error rates and other statistical data maintained by the receiver may need to be delivered to a management element co-located with the transmitter. As another example, the transmitter and receiver may need to coordinate adjustment or configuration of parameters such as equalization or sample timing, either during system initialization or as part of normal operation.

Embodiments having a full-duplex communication path (for example, comprised of Glasswing channels operating in both directions,) can utilize a communication protocol that permits command/control/management information to be multiplexed with user data over the common communication path. But, such a solution is not available in a more restricted embodiment incorporating only simplex or unidirectional data communication, such as the single Glasswing channel from transmitter to receiver of the present examples. In prior art embodiments, this problem may have been resolved by incorporating a secondary data link such as a physically separate serial line, to provide communication from the receiving device back to the transmitting device.

In present embodiments, the previously unused common mode sub-channel vector of the ODVS code is used to provide this secondary data link via transmission of common-mode codewords. As previously mentioned, the common-mode codewords are orthogonal to all other sub-channel constituent codewords, thus its judicious use will not impact data communications. The above-described MICs are resilient to common-mode codewords, as a sum of the input coefficients to each MIC is equal to zero. Thus, any common-mode signals on the wires from common mode codewords will be canceled out due to the balanced nature of the MICs. However, as the common mode transmission characteristics with respect to noise, signal perturbations, etc. may be poorer than the primary data sub-channels, this secondary channel will typically be operated at a lower rate and optionally with additional signal filtering. As the actual wires of the communications medium are terminated identically at each end and the propagation time over the channel is very short compared to this lower signaling rate, the common mode of the channel may be driven from either (or indeed, both) ends.

In a first embodiment, the previously-described transmitter peak-to-peak swing of 300 mV superimposed on a baseline voltage level of 450 mV is augmented by a receiver-generated common mode signal of approximately 50 mV peak-to-peak, effectively causing the baseline voltage to vary between approximately 425 mV to 475 mV. This common-mode range is well within the normal operating region of the receiver front end, and the overall signal excursions of the combined transmit signal and baseline remain within the linear operating region of the receiver as well. Other embodiments may use lower or higher signaling levels on the common mode channel.

Figure 3:
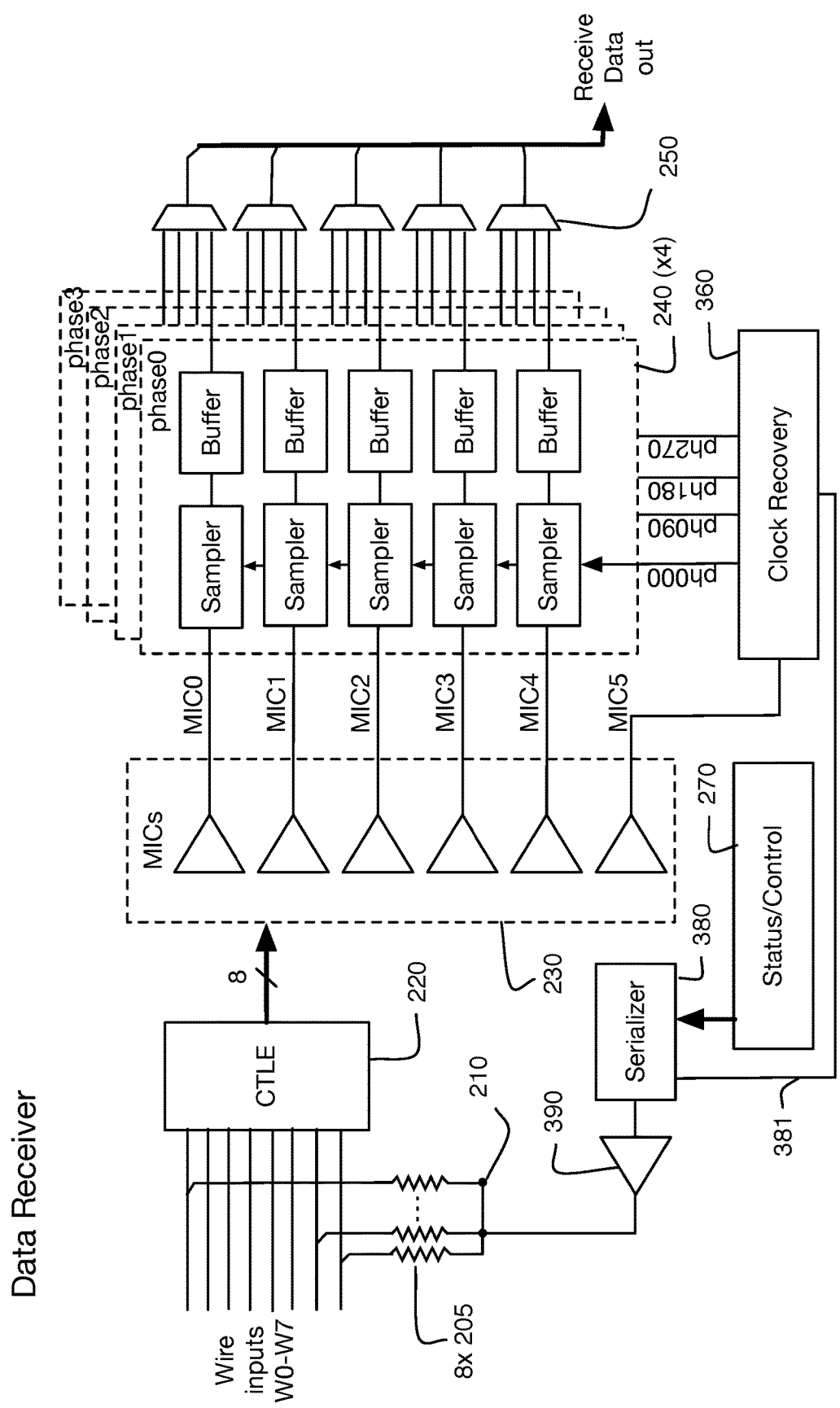
FIG. 3 is a block diagram of an embodiment of a data receiver for the Glasswing ODVS code incorporating a reverse channel transmitter using common-mode signaling on the communications medium.

A receiver in accordance with this embodiment is shown in FIG. 3. At the receiver, common mode codewords are transmitted by modulating weights of the common-mode sub-channel vector according to a corresponding bit a baseline voltage at node 210 using voltage output driver 390, supplementing or reducing the common mode voltage collectively obtained by termination resistors 205 as previously described. An alternative embodiment utilizes switched current sources injecting current directly into each wire of the communications path (and/or sinking current from each wire.) The additional receive termination capacitance introduced by the alternative approach may reduce received signal quality on the primary data channel.

Reverse-channel data Serializer 380 generates a serial stream of reverse channel data bits, with timing controlled by reverse channel clock 381 generated by Clock Recovery 360. For an example embodiment in which the primary channels are operating at 25 Gigabits/second (that is, with a transmit Unit Interval or UI of 40 psec) a clock division factor of 256× may be used within Clock Recovery 360 to produce clock 381, supporting a reverse channel data rate of approximately 10 Mbps.

Figure 4:
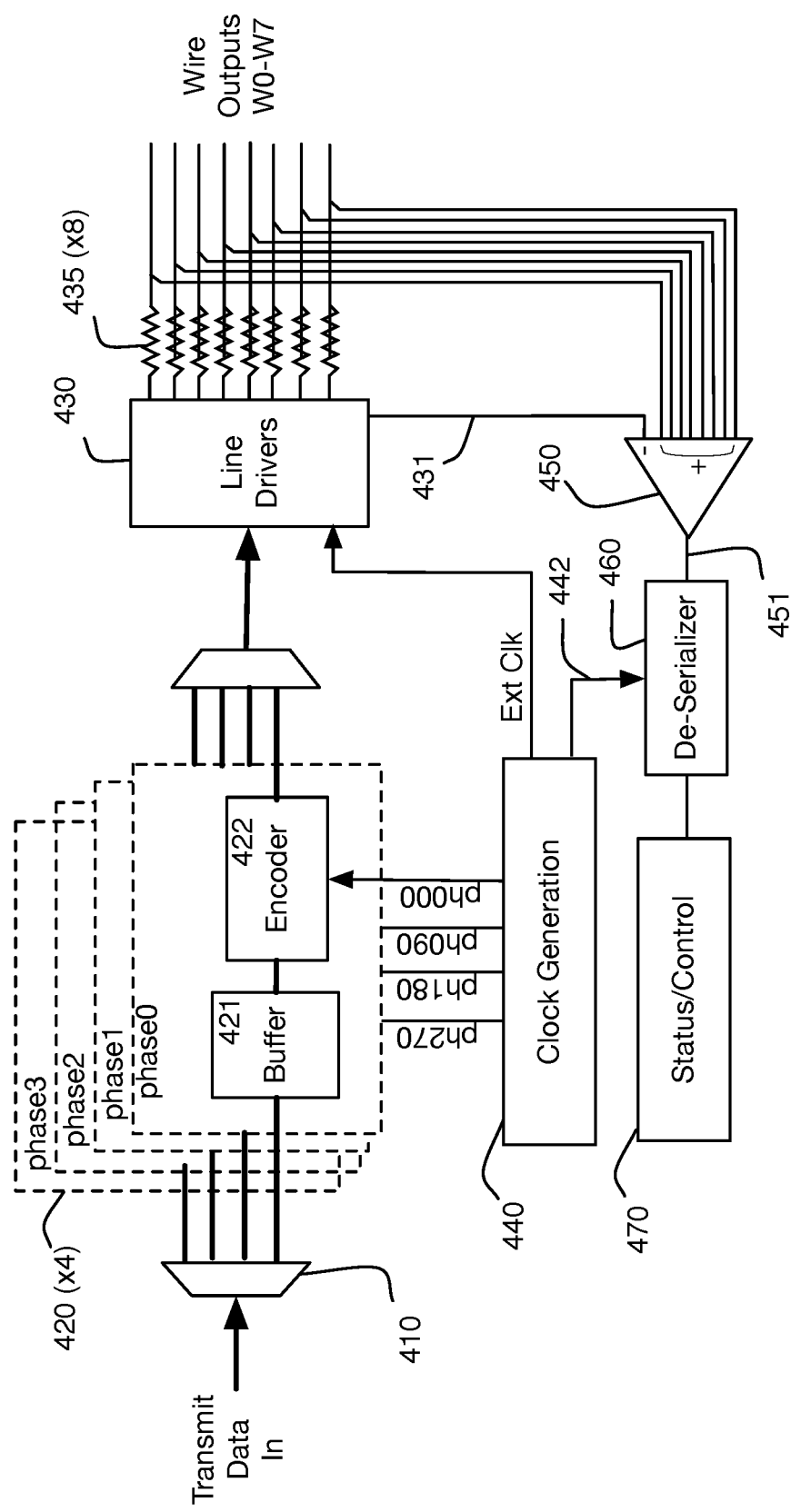
FIG. 4 is a block diagram of an embodiment of a data transmitter for the Glasswing ODVS code for receiving reverse channel transmissions using common-mode signaling on the communications medium.

A Glasswing transmitter embodiment is shown in FIG. 4 incorporating a reverse channel receiver for detecting the reverse channel transmissions of the FIG. 3 embodiment. As shown, transmit data in is demultiplexed 410 into a plurality of transmission phases 420, each phase buffering 421 and encoding 422 the transmit data. Each phase receives a corresponding clock phase from clock generation circuit 440. In this embodiment, a common-mode MIC or comparable summation circuit 450 equally sums signals from each wire W0-W7, and compares the result against a reference voltage 431 derived from the default baseline signal utilized by transmit Line Drivers 430. The result 451 corresponds to the variations from the transmitted baseline voltage induced into the common mode of the communications channel by the reverse channel transmissions of FIG. 3. De-Serializer 460 samples signal 451 using a clock 442 provided by clock generation circuit 440 and delivers the resulting information to Status/Control system 470. In some embodiments, the transmitter of FIG. 4 may include a serializer 380 and may generate common-mode codewords to send to a receiver. In such embodiments, the receiver may include a common-mode MIC 450 to detect the common-mode codewords sent from the transmitter. In some embodiments, the multi-wire bus may operate in a full-duplex mode in sending common-mode codewords, while alternative embodiments may alternately send common-mode codewords.

Figure 6:
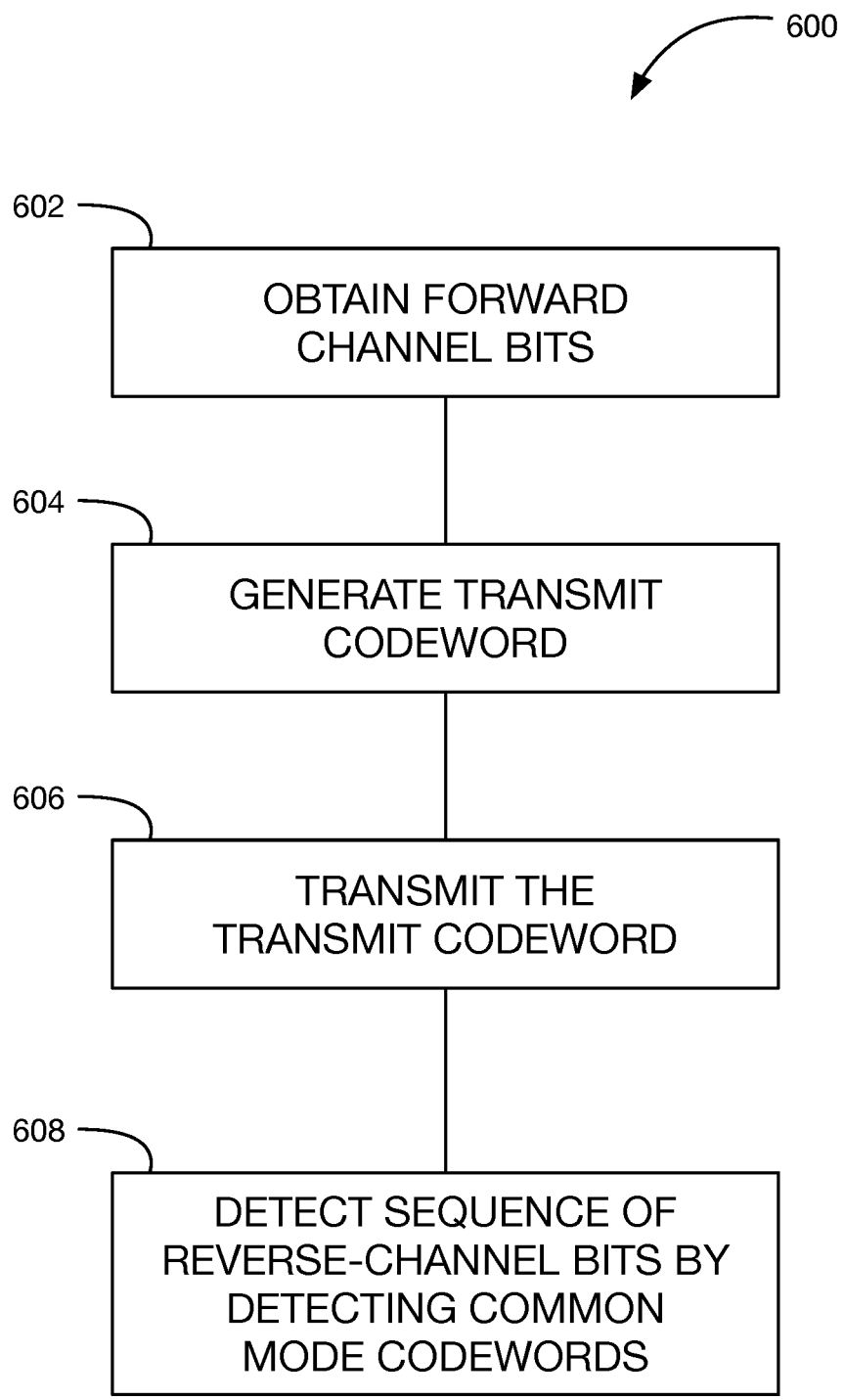
FIG. 6 is a flowchart of a process for a transmitter, in accordance with some embodiments.

FIG. 6 is a flowchart of a method 600 for a transmitter, in accordance with some embodiments. At step 602, the transmitter obtains a set of forward-channel bits. At step 604, an encoder 422 generates a transmit codeword of a vector signaling code, the transmit codeword representing an aggregate sum of sub-channel constituent codewords, each sub-channel constituent codeword represented by a weighting of a corresponding sub-channel vector of a plurality of sub-channel vectors of an orthogonal matrix, each sub-channel vector weighted by a corresponding bit of the set of forward-channel bits, each sub-channel vector (i) mutually orthogonal and (ii) orthogonal to a common-mode sub-channel vector. At step 606, line drivers 430 transmit the transmit codeword over wires of a multi-wire bus. At step 608, a common-mode MIC 450 (or other similar circuit) detects a sequence of reverse-channel bits by detecting common-mode codewords via the multi-wire bus, each common-mode codeword represented as modulations of the common-mode sub-channel vector on the wires of the multi-wire bus.

In some embodiments, each common-mode codeword is detected by summing values on the wires of the multi-wire bus and comparing the summation to a reference voltage. In such embodiments, a common-mode multi-input comparator (MIC) may sum the values and compares the summation to the reference voltage.

In some embodiments, the sequence of reverse-channel bits includes one or more control information bits, error performance bits, and/or command bits. In some embodiments, each common-mode codeword is received at a rate lower than a rate for transmitting the transmit codeword.

In some embodiments, the method further includes transmitting a transmit common-mode codeword by modulating the common-mode sub-channel vector according to an obtained sequence of forward-channel bits.

It should be noted that the usual source-series-terminated line drivers utilized in a Glasswing transmitter are shown in FIG. 4 as being comprised of separate voltage output Line Drivers 430 and series termination resistors 435. This illustrative variation was made to better show how signal variations produced at the data receiver may be detected on wires W0-W7 despite those wires being driven by Line Drivers 430, due to the isolating effect of series termination resistors 435. No limitation is implied, as comparable behavior may be obtained using other known line driver, receiver, and termination methods and apparatus.

An integrating slicer may also be used to sample the summed MIC output 451 prior to De-Serialization. To reduce the impact of noise on the received signal, a long integration window may be used, such as 1 nsec for a 10 Mbps reverse channel.

As the rate of reverse channel data transitions is locked by a known ratio to the primary data channel clock rate, there is no need for a full clock data recovery (CDR) system on the reverse channel. In one particular embodiment, the phase of reverse channel sample timing and framing of serial character sequences carried on that channel is derived by counting UI intervals from a fixed alignment point defined during system initialization. In another embodiment, these values are obtained by the reverse channel receiver detecting a startup sequence of known bit patterns that is transmitted over the reverse channel during system initialization.

It should be noted that the common mode signal levels observed at the transmitter will be influenced by changes in the terminating impedance provided by the transmit driver. Thus, the variable impedance presented by [Amiri I] may introduce spurious high frequency (i.e. UI rate) modulation of the received common mode signal.

In some embodiments, common-mode codewords may be driven from both ends of the channel. For example, a transmitter as shown in FIG. 4 may transmit common-mode codewords to a receiver as shown in FIG. 3, while the receiver also sends codewords to the transmitter. In such embodiments, the transmitter and receiver may modulate the baseline voltages of the wires by different magnitudes, and one or more common-mode MICs (such as common-mode MIC 450 in FIG. 4) may utilize various reference voltages to identify inbound common-mode codewords.

Figure 5:
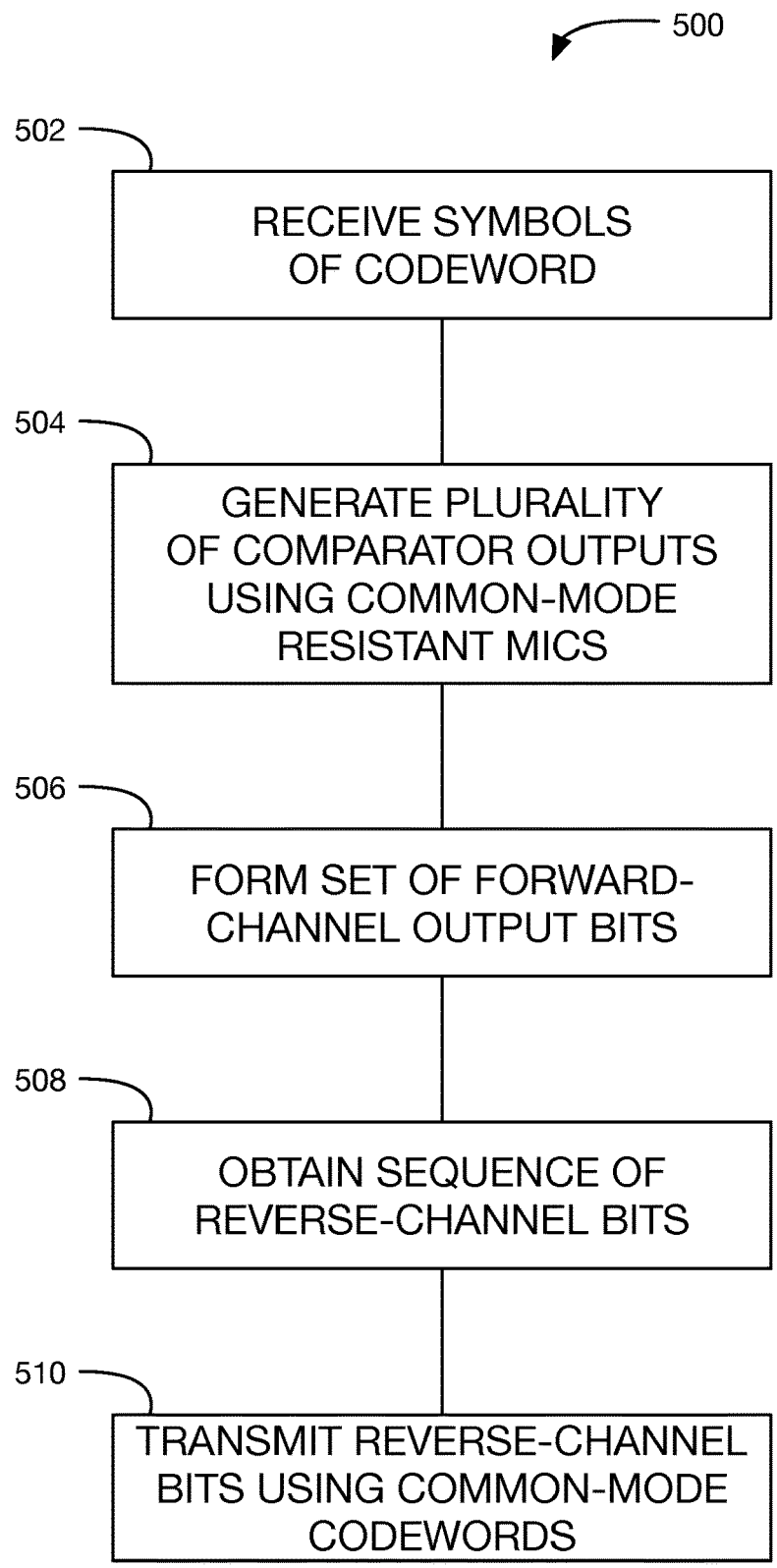
FIG. 5 is a flowchart of a process for a receiver, in accordance with some embodiments.

FIG. 5 is a flowchart of a method 500 in accordance with some embodiments. As shown, at step 502, a receiver receives symbols of a codeword, the symbols received via wires of a multi-wire bus, the codeword representing an aggregate sum of a plurality of sub-channel constituent codewords, each sub-channel constituent codeword representing a weight applied to an associated sub-channel vector of a plurality of sub-channel vectors of an orthogonal matrix. At block 504, a plurality of common-mode resistant multi-input comparators (MICs) generate a plurality of comparator outputs using, each common-mode resistant MIC having a set of input coefficients representing a corresponding sub-channel vector of the plurality of sub-channel vectors, each sub-channel vector (i) mutually orthogonal and (ii) orthogonal to a common-mode sub-channel vector, each comparator output indicative of the weight applied to the corresponding sub-channel vector. At block 506, the receiver outputs a set of forward-channel output bits formed based on the plurality of comparator outputs. At step 508, the receiver obtains a sequence of reverse-channel bits, and at block 510, the sequence of reverse-channel bits is transmitted by sequentially transmitting common-mode codewords over the wires of the multi-wire bus, each common-mode codeword transmitted by modulating weights of a common-mode sub-channel vector according to a corresponding bit in the sequence of reverse-channel bits.

In some embodiments, wherein the set of forward-channel bits further comprises an output bit formed from a comparator output of a common-mode MIC. In some embodiments, the reverse-channel bits are selectively transmitted, and wherein the output bit formed from a comparator output of a common-mode MIC is formed in a time interval when the reverse-channel bits are not being transmitted.

In some embodiments, the reverse-channel bits are transmitted at a rate that is less than a symbol rate of the received symbols of the codeword. In some embodiments, the rate of the reverse-channel codeword is 256× slower than the symbol rate of the received symbols. In some embodiments, the symbol rate is 25 Gigabits per second, and wherein the rate of the reverse-channel codeword is 10 Megabits per second.

In some embodiments, the reverse-channel bits are obtained from a serializer.

In some embodiments, the reverse-channel bits are command bits. In some embodiments, the reverse-channel bits comprise error information. In some embodiments, the reverse-channel bits comprise management information.

While the above embodiments describe use of a "Glasswing" code, it should be noted that other types of orthogonal differential vector signaling codes may be used as well. For example, the "Ensemble Non Return to Zero" (ENRZ) code may be used, also referred to herein as the "H4" code as it is based on the H4 Hadamard matrix. Such a transformation is described in [Cronie II]. As described by the equation below, 3 bits b[0]-b[2] are transformed into 4 symbols of an H4 codeword v[0]-v[3].

$$\begin{bmatrix} v[0] \\ v[1] \\ v[2] \\ v[3] \end{bmatrix} = \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} 0 \\ b[0] \\ b[1] \\ b[2] \end{bmatrix}$$

The above code includes 8 different codewords that are permutations of $\pm[1\ -1/3\ -1/3\ -1/3]$.

A multi-input comparator circuit to detect the above code sums the received signal values on two selected wires, sums the received signal values on the remaining two wires, and outputs a comparison of the two summed results (e.g., by subtracting the two sums, and providing an analog output that may then be sampled or sliced), combining elements of line receiver and H4 code word detection operations. Another embodiment further may incorporate line equalization and amplification into the same circuit. Alternative embodiments utilizing separate summation, difference, and/or comparison functions are equivalent to the example integrated design.

For some mappings of host data to transmitted H4 code words, a direct relationship between the detected result of the three receive multi-input comparators and the receive host data exists, so no additional mapping logic is required at the receiver. At the receiver, three multi-input comparators perform the operations:

MIC0=(Wire 1+Wire 2)>(Wire 3+Wire 4)

MIC1=(Wire 1+Wire 3)>(Wire 2+Wire 4)

MIC2=(Wire 1+Wire 4)>(Wire 2+Wire 3)

Figure 7:
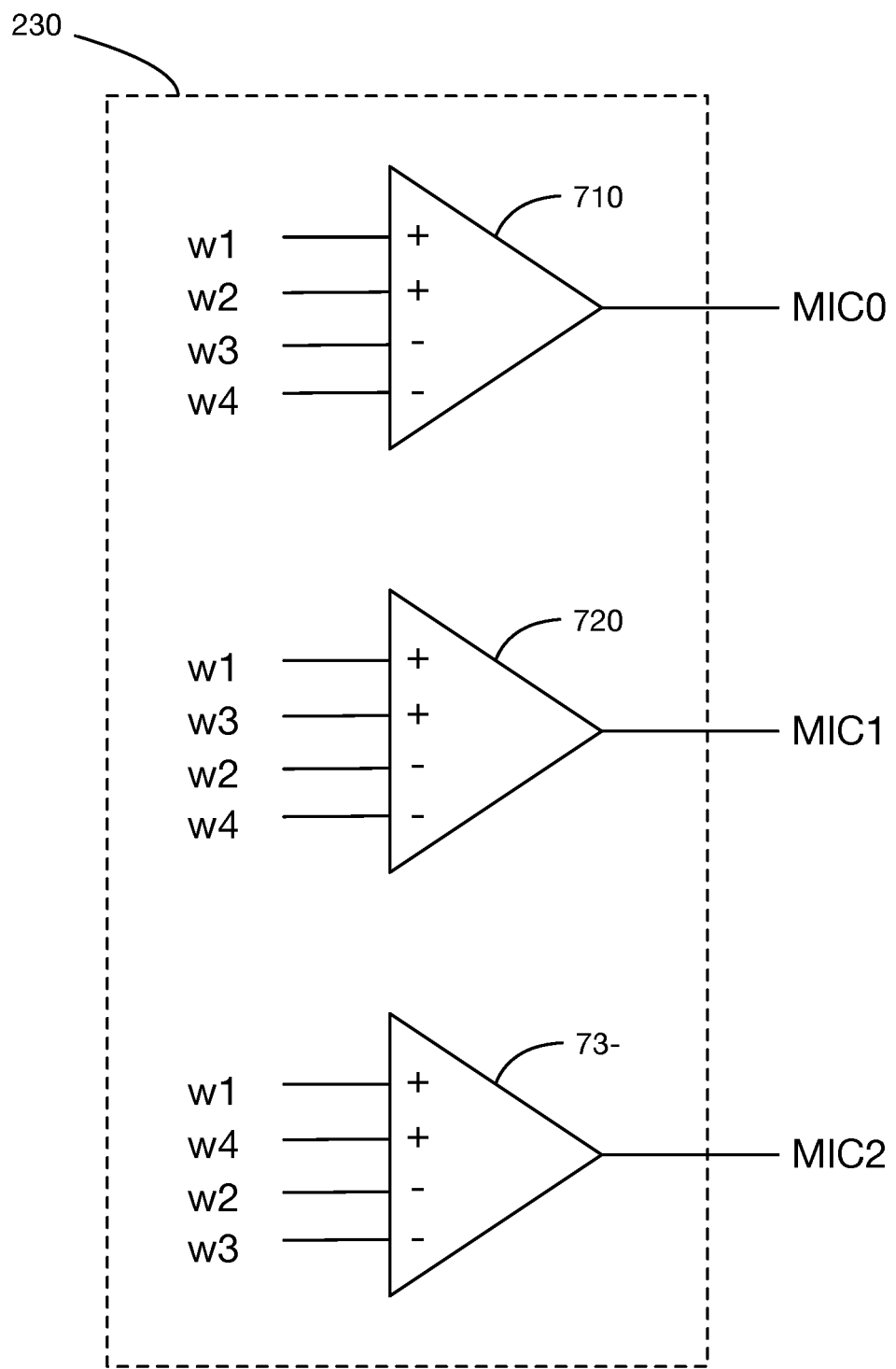
FIG. 7 is a block diagram of an H4 comparator network, in accordance with some embodiments.

An exemplary comparator network 230 in FIG. 2 may take the form of the comparator network 230 shown in FIG. 7 that performs the above equations. As shown, comparator network 230 includes three multi-input comparators 710, 720, and 730, each configured to implement one of the 3 equations above.

The particular signal levels, data rates, and sampling methods described are provided for purposes of description, and do not suggest limitation. Further embodiments may incorporate described apparatus, methods, and known art in any combination.

The examples presented herein illustrate the use of vector signaling codes for point-to-point wire communications. For purposes of explanation, interconnection between a first transmitting device and a second receiving device have been described as unidirectional signaling networks. However, this should not been seen in any way as limiting the scope of the described embodiments. The methods disclosed in this application are equally applicable to networks for alternating signaling direction (i.e. half duplex), or of providing simultaneous communication between separate transmitters and receivers in both directions (i.e. full duplex.) Similarly, more than one instance of the described embodiments may be used essentially in parallel to communicate wider data words and/or provide higher overall communication bandwidth, with individual instances having individual embedded clocks, or two or more instances sharing a common clock. Other communication media including optical and wireless communications may similarly be used rather than the described wire interconnections. Thus, descriptive terms herein such as "voltage" or "signal level" should be considered to include equivalents in other measurement systems, such as "optical intensity", "RF modulation", etc. As used herein, the term "physical signal" includes any suitable behavior and/or attribute of a physical phenomenon for conveying information. Physical signals may be tangible and non-transitory.

I claim:

1. A method comprising:
obtaining a set of forward-channel bits at a transmitter;
generating a plurality of symbols of a codeword based on a set of weights determined from the obtained set of forward-channel bits, the plurality of symbols of the codeword representing an aggregate sum of a plurality of sub-channel constituent codewords, each sub-channel constituent codeword representing a corresponding weight of the set of weights applied to a sub-channel vector of a plurality of mutually orthogonal sub-channel vectors;
transmitting each symbol of the codeword as a signal over a respective wire of a multi-wire bus to a receiver; and
obtaining, at a common-mode multi-input comparator (MIC) in the transmitter via the multi-wire bus, symbols of a common-mode codeword formed using a common-mode sub-channel vector that is mutually orthogonal to the plurality of sub-channel vectors, the common-mode sub-channel vector weighted by a reverse-channel bit of a sequence of reverse-channel bits, the common-mode MIC generating an output corresponding to the reverse-channel bit of the sequence of reverse-channel bits.

2. The method of claim 1, wherein a forward-channel bit of the set of forward-channel bits is transmitted using the common-mode sub-channel vector.

3. The method of claim 2, wherein the forward-channel bit transmitted using the common-mode sub-channel vector is transmitted in a time interval when the sequence of reverse-channel bits is not being received.

4. The method of claim 1, wherein the symbols of the common-mode codeword are received at a rate that is less than a symbol transmission rate of the plurality of symbols of the codeword.

5. The method of claim 4, wherein the rate of the symbols of the common-mode codeword is 256 times slower than the symbol transmission rate of the plurality of symbols of the codeword.

6. The method of claim 1, wherein the sequence of reverse-channel bits is formed using a serializer.

7. The method of claim 1, wherein the sequence of reverse-channel bits comprises bits selected from the group consisting of: command bits, error information bits, and management information bits.

8. The method of claim 1, wherein the plurality of sub-channel vectors and the common-mode sub-channel vector form an orthogonal matrix represented by M:

$$M = \begin{bmatrix} 1 & 1 & 1 & 1 & 1 & 1 \\ 1 & -1 & 0 & 0 & 0 & 0 \\ 1/2 & 1/2 & -1 & 0 & 0 & 0 \\ 0 & 0 & 0 & 1 & -1 & 0 \\ 0 & 0 & 0 & 1/2 & 1/2 & -1 \\ 1/3 & 1/3 & 1/3 & -1/3 & -1/3 & -1/3 \end{bmatrix}.$$

9. The method of claim 1, wherein the common-mode MIC generates the reverse-channel bit by detecting a baseline voltage of the wires of the multi-wire bus.

10. The method of claim 1, wherein the common-mode codeword is transmitted by sourcing or sinking current into the wires of the multi-wire bus.

11. An apparatus comprising:
an encoder configured to obtain a set of forward-channel bits at a transmitter, and to responsively generate a plurality of symbols of a codeword based on a set of weights determined from the set of forward-channel bits, the plurality of symbols of the codeword representing an aggregate sum of a plurality of sub-channel constituent codewords, each sub-channel constituent codeword representing a corresponding weight of the set of weights applied to a sub-channel vector of a plurality of mutually orthogonal sub-channel vectors;
a plurality of line drivers, each line driver configured to transmit a respective symbol of the plurality of symbols of the codeword as a signal over a respective wire of a multi-wire bus to a receiver; and
a common-mode multi-input comparator (MIC) in the transmitter configured to receive, via the multi-wire bus, symbols of a common-mode codeword formed using a common-mode sub-channel vector that is mutually orthogonal to the plurality of sub-channel vectors, the common-mode sub-channel vector weighted by a reverse-channel bit of a sequence of reverse-channel bits, the common-mode MIC generating an output corresponding to a reverse-channel bit of the sequence of reverse-channel bits.

12. The apparatus of claim 11, wherein the encoder is configured to generate a sub-channel constituent codeword of the plurality of sub-channel constituent codewords by weighting the common-mode sub-channel vector according to a forward-channel bit in the set of forward-channel bits.

13. The apparatus of claim 11, wherein the encoder is configured to generate the sub-channel constituent codeword by weighting the common-mode sub-channel vector in a time interval when the symbols of the common-mode codeword are not being received.

14. The apparatus of claim 11, wherein the common-mode MIC is configured to receive the symbols of the common-mode codeword at a rate that is less than a symbol transmission rate of the plurality of symbols of the codeword.

15. The apparatus of claim 14, wherein the rate of the symbols of the common-mode codeword is 256 times slower than the symbol transmission rate of the received symbols.

16. The apparatus of claim 11, wherein the sequence of reverse-channel bits is obtained from a serializer.

17. The apparatus of claim 11, wherein the sequence of reverse-channel bits comprises bits selected from the group consisting of: command bits, error information bits, and management information bits.

18. The apparatus of claim 11, wherein the common-mode MIC is configured to generate the reverse-channel bit by detecting a baseline voltage of the wires of the multi-wire bus.

19. The apparatus of claim 11, further comprising a plurality of switched-current sources configured to sink or supply current to the wires of the multi-wire bus to transmit the common-mode codeword.

20. The apparatus of claim 11, wherein the plurality of sub-channel vectors and the common-mode sub-channel vector form an orthogonal matrix represented by M:

$$M = \begin{pmatrix} 1 & 1 & 1 & 1 & 1 & 1 \\ 1 & -1 & 0 & 0 & 0 & 0 \\ 1/2 & 1/2 & -1 & 0 & 0 & 0 \\ 0 & 0 & 0 & 1 & -1 & 0 \\ 0 & 0 & 0 & 1/2 & 1/2 & -1 \\ 1/3 & 1/3 & 1/3 & -1/3 & -1/3 & -1/3 \end{pmatrix}.$$

* * * * *